(12) United States Patent
Shuck

(10) Patent No.: US 8,859,054 B2
(45) Date of Patent: Oct. 14, 2014

(54) SYSTEM AND METHOD FOR DEPOSITING MATERIAL IN A SUBSTRATE

(75) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 13/337,189

(22) Filed: Dec. 26, 2011

(65) Prior Publication Data

US 2012/0164349 A1 Jun. 28, 2012

Related U.S. Application Data

(60) Provisional application No. 61/427,729, filed on Dec. 28, 2010.

(51) Int. Cl.
- *B05D 3/06* (2006.01)
- *C23C 28/02* (2006.01)
- *C23C 24/10* (2006.01)
- *C23C 26/02* (2006.01)

(52) U.S. Cl.
CPC ............... *C23C 28/02* (2013.01); *C23C 24/10* (2013.01); *C23C 26/02* (2013.01)

USPC .......................................... 427/553; 427/140

(58) Field of Classification Search
USPC .......................................... 427/561, 402, 140
See application file for complete search history.

(56) References Cited

U.S. PATENT DOCUMENTS

| | | | |
|---|---|---|---|
| 5,418,003 A | 5/1995 | Bruce et al. | |
| 5,773,078 A | 6/1998 | Skelly | |
| 5,837,960 A * | 11/1998 | Lewis et al. | 219/121.63 |
| 6,916,529 B2 * | 7/2005 | Pabla et al. | 428/325 |
| 2007/0003416 A1 * | 1/2007 | Bewlay et al. | 416/241 B |

* cited by examiner

*Primary Examiner* — Dah-Wei D Yuan
*Assistant Examiner* — Nga Leung V Law
(74) *Attorney, Agent, or Firm* — Barnes & Thornburg LLP

(57) ABSTRACT

One embodiment of the present invention is a unique method for depositing materials in a substrate. Another embodiment is a unique system for depositing materials in a substrate. Other embodiments include apparatuses, systems, devices, hardware, methods, and combinations for depositing materials within a substrate. Further embodiments, forms, features, aspects, benefits, and advantages of the present application will become apparent from the description and figures provided herewith.

13 Claims, 1 Drawing Sheet

SYSTEM AND METHOD FOR DEPOSITING MATERIAL IN A SUBSTRATE

CROSS REFERENCE TO RELATED APPLICATIONS

The present application claims benefit of U.S. Provisional Patent Application No. 61/427,729, filed Dec. 28, 2010, entitled SYSTEM AND METHOD FOR DEPOSITING MATERIAL IN A SUBSTRATE, which is incorporated herein by reference.

FIELD OF THE INVENTION

The present invention relates to material deposition, and more particularly, to depositing material in a substrate.

BACKGROUND

Methods and systems that effectively deposit material, such as particles, into a substrate, remain an area of interest. Some existing systems have various shortcomings, drawbacks, and disadvantages relative to certain applications. Accordingly, there remains a need for further contributions in this area of technology.

SUMMARY

One embodiment of the present invention is a unique method for depositing materials within a substrate. Another embodiment is a unique system for depositing materials within a substrate. Other embodiments include apparatuses, systems, devices, hardware, methods, and combinations for depositing materials within a substrate. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
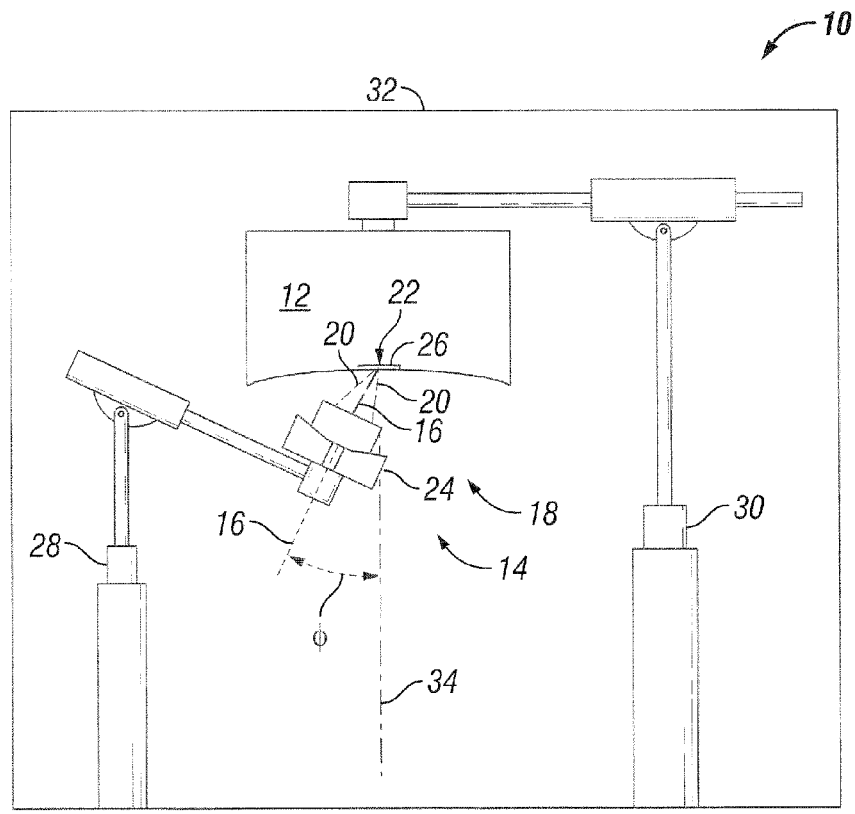
FIG. 1 schematically illustrates some aspects of a non-limiting example of a system for adding particles to a substrate for forming a matrix material in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to the drawings, and in particular FIG. 1, some aspects of a non-limiting example of a system 10 for adding particles to a substrate 12 for forming a matrix material in accordance with an embodiment of the present invention is schematically depicted. For example, in the case of a metallic substrate 12 and particles in the form of oxides or other composite material, system 10 forms a matrix material in the form of a metal matrix composite. In other embodiments, other matrix materials may be formed by system 10, including metal/metal matrix materials, and metal/metal/composite matrix materials, e.g., where one of the metals is substrate 12, and the other of the metals and the composite is from particles added to substrate 12. In one form, system 10 is configured to achieve a desired level of porosity on the surface of substrate 12.

In one form, substrate 12 is an abradable blade track for a gas turbine engine. In other embodiments, substrate 12 may be any component, including, for example, a gas turbine engine blade; vane or series of vanes; an abradable blade track for a compressor, fan or turbine; another gas turbine engine flowpath component or any other gas turbine engine component; or any mechanical component for any machine, device, system or structure. In one form, substrate 12 is a metallic component. In other embodiments, substrate 12 may be formed of one or more metallic and/or non-metallic materials.

System 10 includes an energy emitter means 14 for directing an energy beam 16 at substrate 12. System 10 also includes a particle sprayer means 18 for directing one or more flow of particles 20 at substrate 12, e.g., at and in the vicinity of the location of impact 22 of energy beam 16 upon substrate 12. In one form, particles 20 are not the same material as substrate 12. In other embodiments, some or all of particles 20 may be the same material as substrate 12. In one form, means 14 and means 18 are housed in a single unit in the form of a combined discharge nozzle 24 that discharges both energy beam 16 and a flow of particles 20. In other embodiments, means 14 and means 18 may take other forms, including discrete discharge devices, and may also include a plurality of discharge devices for discharging energy beam 16 and/or flow of particles 20.

In one form, means 14 is configured and operative to form and direct energy beam 16 in the form of a laser beam. In other embodiments, means 14 may be configured to form other types of energy beams, e.g., including but not limited to one or more electron beams and/or one or more electric arcs. Means 14 is configured and positioned to direct energy beam 16 from below a portion of substrate 12 upward toward the portion of substrate 12. Energy beam 16 is configured form a melt pool 26 in that portion of substrate 12 from the underside of substrate 12. Energy beam 16 forms melt pool 26 by locally melting substrate 12, whereby melt pool 26 faces in a vertically downward-facing direction, i.e., is upside-down.

Means 18 is configured and operative to direct flow of particles 20 from below the portion of substrate 12 upward toward the portion so that at least some of the particles 20 engage and enter melt pool 26. In one form, some of the particles 20 have a property different than the other particles. For example, in one form, particles 20 are an aggregation of different kinds of particles, wherein some of the particles may have a lower density than others, and/or some particles may have a higher buoyancy in melt pool 26 relative to other particles. The particles having the different property are configured to rise in melt pool 26 toward substrate 12 (un-melted portions of substrate 12). Particles 20 may be formed of the same or different material, and may have the same or different size and shape, depending upon the needs of the particular embodiment. In one form, the particles are composite particles, e.g., ceramic composite. In other embodiments, the particles may be formed of metallic particles in addition to or in place of nonmetallic particles. Some particles may be hollow, e.g., hollow metallic and/or nonmetallic spheres or other shapes, whereas other particles may be solid, depending upon the particular embodiment. In still other embodiments, particles 20 may include reactive pore formers in addition to or in place of other types of particles. In yet other embodiments, all particles 20 may be the same or substantially the same, e.g., in composition, size and shape, and may all be configured to rise in melt pool 26 toward substrate 12 (un-melted portions of substrate 12).

System 10 is configured to allow the particles having the desired property to rise in melt pool 26 upward toward proximity with un-melted portions of substrate 12. For example, in one form, system 10 supplies sufficient energy to maintain melt pool 26 laden with particles 20 for a sufficient period of time to allow the particles with the different property to rise upward in melt pool 26. By forming melt pool 26 in a downward facing direction, the particles having the different property may rise upward toward substrate 12, for example, forming a desired degree of porosity in substrate 12 adjacent to un-melted portions of substrate 12. This is contrary to other systems that form a melt pool on an upper or side surface of the substrate, wherein the desired particles may not migrate toward un-melted portions of the substrates.

System 10 also includes a positioning system 28 and a positioning system 30. In one form, system 10 also includes an enclosure 32 configured to enclose substrate 12, means 14, means 18, positioning system 28 and positioning system 30. Positioning system 28 is coupled to combined discharge nozzle 24 and operative to translate and/or rotate combined discharge nozzle 24 to form melt pool 26 using energy beam 16. In one form, positioning system 28 is also configured to progressively or intermittently transition melt pool 26 to other portions of substrate 12, e.g., portions adjacent to the initial or subsequent instances of melt pool 26 that are also disposed in a vertically downward-facing direction. In embodiments wherein energy emitter means 14 and particle sprayer means 18 are not combined into a single head, or where multiple means 14 and means 18 are employed, additional positioning systems may be coupled to each of means 14 and means 18. In one form, positioning system 28 is a multi-axis positioning system. In other embodiments, positioning system 28 may be a single axis positioning system.

Positioning system 30 is coupled to and supports substrate 12, and is operative to translate and/or rotate substrate 12 to form melt pool 26 in desired locations on substrate 12 using energy beam 16. In one form, positioning system 30 is also configured to progressively or intermittently dispose second and subsequent portions of substrate 12 to energy beam 16 and flow of particles 20, e.g., portions adjacent to the initial or subsequent instances of melt pool 26 that are also disposed in a vertically downward-facing direction. In one form, positioning system 30 is configured to rotate substrate 12 so that the desired melt pool 26 is facing downward. In one form, positioning system 30 is a multi-axis positioning system. In other embodiments, positioning system 30 may be a single axis positioning system.

In various embodiments, one or both of positioning systems 28 and 30 may be employed to position substrate 12 at the desired location to form melt pool 26 in a downward-facing direction. Other embodiments may not employ a positioning system to position substrate 12, e.g., depending upon the geometry of substrate 12. For example, if substrate 12 has a relatively flat surface that may be fixed in place, positioning system 30 may be replaced by a simple support system to maintain substrate 12 in the desired orientation. Still other embodiments may not employ a positioning system(s) to position means 14 and/or means 18, but rather may employ a simple support system to support means 14 and/or means 18, relying upon positioning system 30 to orient substrate 12 in the desired position.

Enclosure 32 is configured to allow control of the atmosphere inside system 10 during the forming of melt pool 26 and spraying of particles 20. In one form, the atmosphere maintained inside enclosure 32 is ambient air. In other embodiments, an inert gas or a vacuum may be contained within enclosure 32.

During the operation of system 10, a desired portion of substrate 12 is disposed in a vertically downward-facing direction, e.g. by positioning system 30. Energy beam 16 is directed from below the portion of substrate 12 where melt pool 26 is desired, and is directed upward toward the portion. In one form, energy beam 16 is directed at the portion of substrate 12 an angle $\phi$ less than 45 degrees from a vertical line 34. In a particular form, energy beam 16 is directed at the portion of substrate 12 an angle $\phi$ less than approximately 15 degrees from vertical line 34. In other embodiments, greater or lesser angles may be employed. Melt pool 26 is then formed by energy beam 16, facing vertically downward from the portion of substrate 12. Once melt pool 26 is formed, a flow of particles 20 is directed from below the portion on substrate 12 upward toward the portion in which melt pool 26 is formed. At least some of the particles are configured to rise in melt pool 26 toward substrate 12. Weld pool 26 is maintained in the liquid state, e.g., by energy beam 16, while the particles rise in the melt pool toward the substrate.

Figure 2:
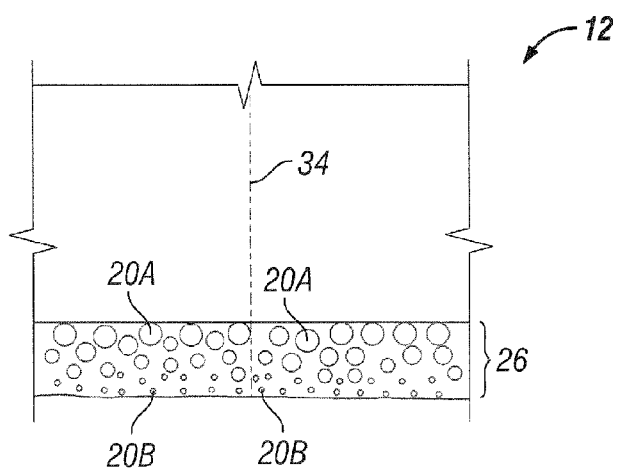
FIG. 2 schematically illustrates some aspects of a non-limiting example of particles disposed within a substrate, forming a matrix material, in accordance with an embodiment of the present invention.

Referring to FIG. 2, in embodiments wherein the particles are not homogeneous, those particles 20A having the property of greater buoyancy in the melt pool and/or less density relative to the other particles 20B are the particles that rise in melt pool 26 toward substrate 12. In embodiments wherein the particles are homogeneous, e.g., having a density and/or buoyancy at desired levels to promote floating toward the top of the upside-down melt pool, similar results in the vicinity of substrate 12 at the top of the upside-down melt pool would be achieved, Various embodiments may include translating and/or rotating substrate 12 to dispose another portion of substrate 12 in a vertically downward-facing direction to form a new melt pool 26 or to transition melt pool 26 to a new location on substrate 12. This may be performed while maintaining melt pool 26 in the vertically downward-facing direction, wherein melt pool 26 is progressively transitioned into the next or other portion of the substrate. Similarly, means 14 and means 18 may be continually or intermittently repositioned in order to transition melt pool 26 from one portion of substrate 12 to another portion of substrate 12.

Once the desired amount of particles 20 has been dispersed into melt pool 26 and the desired particles have risen in the melt pool toward substrate 12, melt pool 26 is solidified, e.g., providing a coating on substrate 12. Such a coating may be, for example, a metal matrix composite coating having a desired level of porosity adjacent to the un-melted portions of substrate 12. The amount of porosity is based on the selection of particles 20. In one form, the amount of porosity is configured for abradability of substrate 12, e.g., in a gas turbine engine blade track component. In other embodiments, the amount of porosity is configured for holding lubrication, e.g., forming a self-lubricating material on substrate 12. In still other embodiments, the amount of porosity is configured to achieve a desired thermal conductivity, e.g., in a turbine section component of a gas turbine engine. In yet other embodiments, the amount of porosity may be configured to achieve other desired properties.

Embodiments of the present invention include a method for depositing materials in a substrate, comprising: disposing a first portion of a substrate in a vertically downward-facing direction; directing an energy beam from below the first portion upward toward the first portion, forming a melt pool in the substrate using the directed energy beam, wherein the melt pool is formed facing in the vertically downward direction in the first portion; and directing a flow of particles from below the first portion upward toward the first portion, wherein at least some of the particles are configured to rise in the melt pool toward the substrate.

In a refinement, at least some of the particles have a property different than the other particles; and the particles having the different property are the at least some particles that rise in the melt pool toward the substrate.

In another refinement, the property is a lower density than the other particles.

In yet another refinement, the property is a higher buoyancy in the melt pool than the other particles.

In still another refinement, the substrate is metallic, and the particles in the melt pool in conjunction with the melted substrate form a metal matrix composite.

In yet still another refinement, the particles include non-metallic particles.

In a further refinement, all the particles are non-metallic particles.

In a yet further refinement, the particles include hollow particles.

In a still further refinement, the particles include reactive pore formers.

In a yet still further refinement, the method further comprises translating and/or rotating the substrate to dispose a second portion of the substrate in a vertically downward-facing direction while maintaining the melt pool in the vertically downward-facing direction, wherein the melt pool is progressively transitioned into the second portion of the substrate.

In another further refinement, the energy beam is a laser.

In yet another further refinement, the method further comprises solidifying the melt pool to form a coating on the substrate.

In still another further refinement, the energy beam is directed at the first portion an angle of less than approximately 15 degrees from vertical.

In yet still another further refinement, the substrate is formed of a material; and wherein the melt pool is formed of the substrate material.

Embodiments of the present invention include a system, comprising: an energy beam emitter positioned to direct an energy beam from below a first portion of a substrate upward toward the first portion, wherein the energy beam is configured to form a melt pool facing in the vertically downward-facing direction in the first portion; and a particle sprayer operative to direct a flow of particles from below the melt pool upward toward the melt pool, wherein the system is configured to allow at least some of the particles to rise in the melt pool toward the substrate.

In a refinement, the system further comprises a positioning system coupled to the substrate and operative to translate and/or rotate the substrate to dispose a second portion of the substrate in a vertically downward-facing direction while maintaining the melt pool in the vertically downward-facing direction.

In another refinement, the positioning system is configured to progressively transition the melt pool from the first portion into the second portion of the substrate.

In yet another refinement, the system further comprises a positioning system coupled to the energy beam emitter and operative to translate and/or rotate the energy beam emitter to form the melt pool in a second portion of the substrate disposed in a vertically downward-facing direction.

In still another refinement, the energy beam emitter is configured to progressively transition the melt pool from the first portion into the second portion of the substrate.

Embodiments of the present invention include a system, comprising: means for disposing a portion of a substrate in a vertically downward-facing direction; means for forming a melt pool in the portion of the substrate using a directed energy beam, wherein the melt pool is formed facing in the vertically downward direction in the portion of the substrate; and means for directing a flow of particles upward and into the melt pool, wherein at least some of the particles have a property different than the other particles, and wherein the particles and the melt pool, once solidified, form a matrix material.

In a refinement, the means for forming the melt pool is configured to direct the energy beam upward to the portion of the substrate at an angle of less than approximately 15 degrees from vertical.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for depositing materials in a substrate, comprising:

disposing a first portion of a substrate in a vertically downward-facing direction;

directing an energy beam from below the first portion upward toward the first portion;

forming a melt pool in the substrate using the directed energy beam, wherein the melt pool is formed facing in a vertically downward direction in the first portion; and directing a flow of particles from below the first portion upward toward the first portion, wherein at least some of the particles are buoyant in the melt pool to move upward through the melt pool toward the substrate;

wherein the particles are not the same material as the substrate; and solidifying the melt pool to form a coating on the substrate;

wherein the solidifying includes forming pores defined by the particles in the coating of the substrate.

2. The method of claim 1, wherein at least some of the particles have a property different than other particles; and wherein the particles having the different property are the at least some particles that rise in the melt pool toward the substrate.

3. The method of claim 2, wherein the property is a lower density than the other particles.

4. The method of claim 2, wherein the property is a higher buoyancy in the melt pool than the other particles.

5. The method of claim 1, wherein the substrate is metallic, and wherein the particles in the melt pool in conjunction with the melted substrate form a metal matrix composite.

6. The method of claim 5, wherein the particles include non-metallic particles.

7. The method of claim 5, wherein all the particles are non-metallic particles.

8. The method of claim 1, wherein the particles include hollow particles.

9. The method of claim 1, wherein the particles include reactive pore formers.

10. The method of claim 1, further comprising translating and/or rotating the substrate to dispose a second portion of the substrate in a vertically downward-facing direction while maintaining the melt pool in the vertically downward-facing direction, wherein the melt pool is progressively transitioned into the second portion of the substrate.

11. The method of claim 1, wherein the energy beam is a laser.

12. The method of claim 1, wherein the energy beam is directed at the first portion an angle of less than approximately 15 degrees from vertical.

13. The method of claim 1, wherein the substrate is formed of a material; and wherein the melt pool is formed of the substrate material.

* * * * *